May 29, 1956
J. V. SIMEK ET AL
2,747,290
GAUGES
Filed July 13, 1954
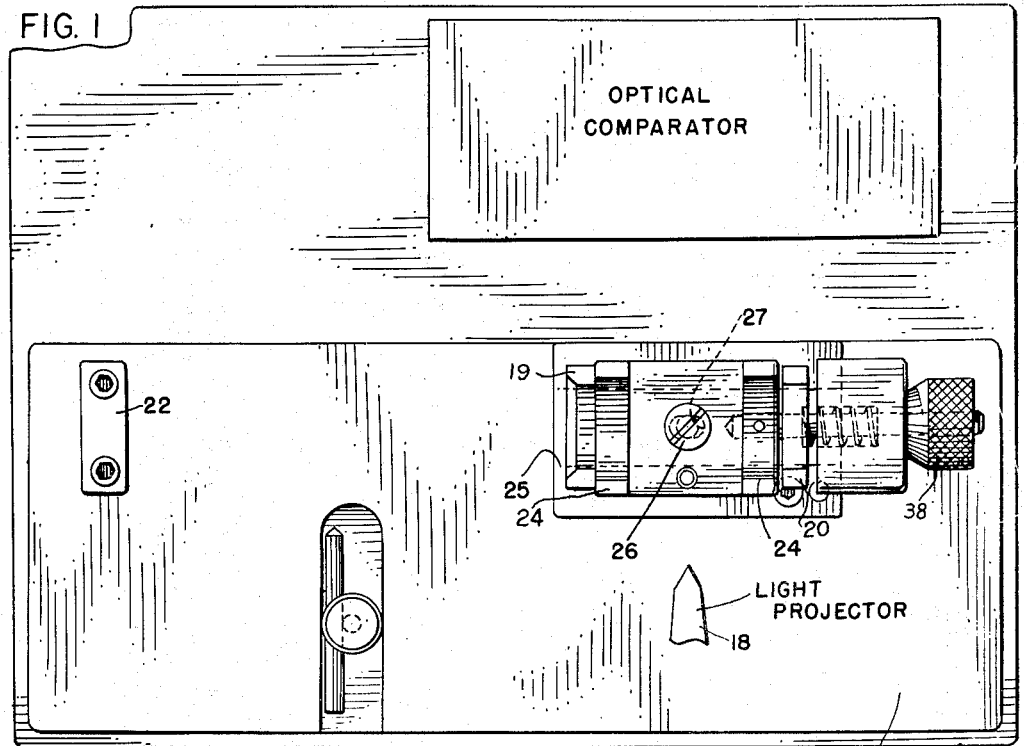
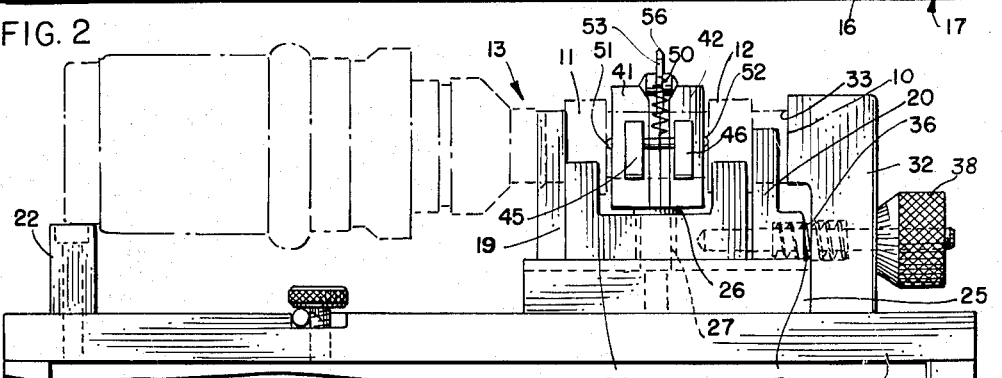
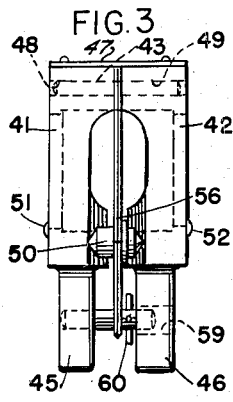
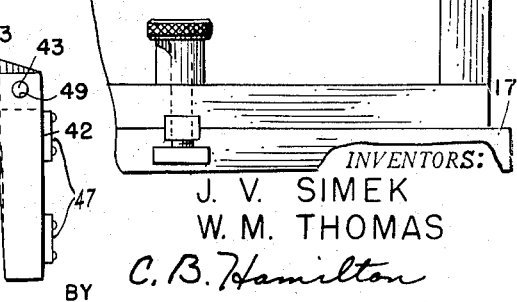
INVENTORS:
J. V. SIMEK
W. M. THOMAS
BY C. B. Hamilton
ATTORNEY ns # United States Patent Office 2,747,290
Patented May 29, 1956

2,747,290

GAUGES

Jerry V. Simek, Berwyn, and Walter M. Thomas, Oak Park, Ill., assignors to Western Electric Company, Incorporated, New York, N. Y., a corporation of New York Application July 13, 1954, Serial No. 443,032

5 Claims. (Cl. 33—174)

This invention relates to gauges, and more particularly to holding and measuring fixtures for optical comparators.

In the manufacture of magnetrons, it is essential to locate precisely the centerline between the two pole pieces of the magnetron. In the past, it has been difficult and time-consuming to effect this result.

An object of the invention is to provide new and improved gauges.

Another object of the invention is to provide new and improved holding and measuring fixtures for optical comparators.

A further object of the invention is to provide gauges for quickly and precisely locating centers between pole pieces of magnetrons.

A gauge illustrating certain features of the invention may include a pair of relatively movable yokes designed to fit slidably on a portion of a cathode mount between pole pieces thereof, and a gauging blade provided with wedging means wedges the yokes against the pole pieces to locate itself in the center between the pole pieces. Means also may be provided for locating an end of the cathode mount at a known point, and an optical comparator measures the position of the blade relative to that point.

A complete understanding of the invention may be obtained from the following detailed description of a gauge forming a specific embodiment thereof, when read in conjunction with the appended drawings, in which Fig. 1 is a top plan view of a gauge forming one embodiment of the invention;

Fig. 2 is a front elevation of the gauge shown in Fig. 1;

Fig. 3 is an enlarged, top plan view of a portion of the gauge shown in Fig. 1, and Fig. 4 is an enlarged, side elevation of the portion of the gauge shown in Fig. 3.

Referring now in detail to the drawings, there is shown therein a gauge for quickly and precisely measuring the distance between an end 10 and the center or midpoint between pole pieces 11 and 12 of a cathode mount 13 of a magnetron. The gauge includes a base 16, which is located precisely in an optical comparator 17 of a well known type having a light projector 18. The cathode mount is placed in yoke forks 19 and 20 fitting against the ends of the pole pieces 11 and 12, respectively, and the lefthand end rests on a support 22 as the mount is so placed. The pole pieces fit loosely in a cradle 24 secured rigidly to the fork 19 and slidably secured to a guideway 25 by a screw 26 fitting in a slot 27. A stud 31 rigidly secured and keyed to the cradle 24 mounts the fork 20 slidably thereon and projects slidably through a locating post 32 having a precisely located face 33. A compression spring 36 on the stud 31 between the post 32 and the fork 20 urges the fork 21 against the pole piece 12 to urge the pole piece 11 against the fork 19 to center the cathode mount between the forks.

A nut 38 is screwed onto the stud 31 to pull the end 10 of the cathode mount against the face 33 to precisely locate the cathode mount in the comparator 17. Yokes 41 and 42 secured together by leaf springs 47 and mounting pins 43 and 44 loosely in bores 48 and 49 then are manually pressed slightly together by lugs 45 and 46 and are slid over the cathode mount 13 between the pole pieces 11 and 12, the yokes fitting closely on the portions of the cathode mount between the pole pieces. Then the lugs are released, and the resiliency of the springs 47, and the action of a wedging pin 50 spread the yokes 41 and 42 apart until projections 51 and 52 engage the adjacent ends of the pole pieces 11 and 12, respectively, to center a knife-edged blade 53 between the pole pieces.

The blade 53 is pivotally mounted on the pin 43, carries the wedging pin 50 rigidly thereon and centered relative thereto, and is urged in a counterclockwise direction, as viewed in Fig. 4, by a tension spring 55 secured to the lefthand end thereof and to the pin 44. This locates a knife edge projection 56 of the blade in the path of the light from the projector and precisely centered relative to the two pole pieces. The pin 44 is rigidly secured to the lug 45, but fits loosely in a bore 59 in the lug 46 to permit the lugs to be moved toward one another, which movement is limited by a stop pin 60.

The comparator measures precisely on a screen or chart (not shown) the position of the projection 56 relative to the face 33, and, since the projection 56 is precisely located at the midpoint between the pole pieces 11 and 12, the distance between end 10 of the cathode mount 13 and the centerline of the cathode is precisely measured.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A fixture for holding a cathode mount for use with an optical gauge to determine the distance between the midpoint between two spaced collars on the cylindrical portion of a cathode mount and one end of the cylindrical portion spaced from the collars, which comprises a cradle for supporting such a cathode mount having a cylindrical portion and spaced collars on the cylindrical portion spaced from an end thereof, a reference stop, means for moving the cradle to a position in which said end of the cathode mount is in engagement with the stop, a pair of relatively movable slides slidable along the cylindrical portion for engaging the ends of the collars, resilient means for urging the slides apart to positions in which the slides engage the ends of the collars, an indicator blade mounted between the slides, and means for centering the blade between the slides.

2. A fixture for holding a cathode mount for use with an optical gauge to determine the distance between an end of a cylindrical portion of the cathode mount and the midpoint between collars on the cylindrical portion spaced from one another and from said end of the cylindrical portion, which comprises means for supporting such a cathode mount having a cylindrical portion and spaced collars on the cylindrical portion spaced from an end thereof in a position in which said end is at a predetermined point, a pair of yokes having projections for engaging the ends of the collars slidable along the cylindrical portion, said yokes also being provided with wedge surfaces, an indicator blade mounted between the yokes, wedge means carried by the blade, and means for urging the blade between the yokes so as to keep the wedge means against the wedge surfaces to urge the yokes against the collars and center the blade between the collars.

3. A holding fixture for cathode mounts for use with an optical gauge to determine the distance between an end of a cathode mount and the midpoint between annular pole pieces on said mount in positions spaced from one another and said end of the cathode mount, which comprises a base having a stop positioned at a predetermined point, a guideway extending away from the stop, means mounted slidably on the guideway for supporting such a cathode mount on opposite sides of a pair of annular pole pieces positioned on the cathode mount, means for pulling the supporting means toward the stop to move an end of the cathode mount against the stop, a pair of yokes fittable slidably on the portion of the cathode mount between the pole pieces for engaging the pole pieces, said yokes also having wedge surfaces thereon, a gauging blade mounted pivotally between the yokes, a pin having tapered ends for engaging the wedge surfaces carried by the blade, and means for urging the blade in such a direction as to force the yokes apart into engagement with the pole pieces.

4. A holding fixture for cathode mounts for use with an optical gauge to determine the distance between an end of a cathode mount and the midpoint between annular pole pieces on said mount in positions spaced from one another and said end of the cathode mount, which comprises a base having a stop positioned at a predetermined point, a guideway extending away from the stop, a first fork slidable along the guideway, a second fork slidable along the guideway positioned between the first fork and the stop, said forks serving to support such a cathode mount on opposite sides of a pair of annular pole pieces positioned on the cathode mount, means for pressing the second fork toward the first fork to engage the pole pieces with the forks, means for pulling the first fork toward the stop to move an end of the cathode mount against the stop, a pair of yokes fittable slidably on the portion of the cathode mount between the pole pieces and having lugs projecting therefrom and projections for engaging the pole pieces, said yokes also having wedge surfaces thereon, a gauging blade mounted pivotally between the yokes, a pin having tapered ends for engaging the wedge surfaces carried by the blade, and means for urging the blade in such a direction as to force the yokes apart into engagement with the pole pieces.

5. A holding fixture for cathode mounts for use with an optical gauge to determine the distance between an end of a cathode mount and the midpoint between annular pole pieces on said mount in positions spaced from one another and said end of the cathode mount, which comprises a base having a stop positioned at a predetermined point, a guideway extending away from the stop, a cradle-like support slidable along the guideway for carrying such a cathode mount on opposite sides of a pair of annular pole pieces positioned on the cathode mount, means for pulling the support toward the stop to move an end of the cathode mount against the stop, a pair of yokes fittable slidably on the portion of the cathode mount between the pole pieces and having lugs projecting therefrom and projections for engaging the pole pieces, said yokes also having wedge surfaces thereon, a gauging blade mounted pivotally between the yokes, a pin having tapered ends for engaging the wedge surfaces carried by the blade, and means for urging the blade in such a direction as to force the yokes apart into engagement with the pole pieces.

References Cited in the file of this patent

UNITED STATES PATENTS

| | | |
|---|---|---|
| 1,067,877 | Needham | July 22, 1913 |
| 1,127,955 | Berthold | Feb. 9, 1915 |
| 1,691,748 | Williams | Nov. 13, 1928 |
| 2,002,679 | Schoof | May 28, 1935 |

FOREIGN PATENTS

| | | |
|---|---|---|
| 475,229 | Germany | Apr. 20, 1929 |